(12) United States Patent
Kadi

(10) Patent No.: US 7,124,262 B2
(45) Date of Patent: Oct. 17, 2006

(54) SELECTIVITY PIPELINING AND PREFETCHING MEMORY DATA

(75) Inventor: Zafer Kadi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/300,401

(22) Filed: Nov. 20, 2002

(65) Prior Publication Data

US 2004/0098552 A1 May 20, 2004

(51) Int. Cl.
*G06F 12/00* (2006.01)

(52) U.S. Cl. .................. 711/156; 711/140; 711/169; 711/137

(58) Field of Classification Search .............. 711/103, 711/137, 169, 140, 145, 156; 712/207
See application file for complete search history.

(56) References Cited

U.S. PATENT DOCUMENTS

| 6,058,456 | A | | 5/2000 | Arimilli et al. | |
|---|---|---|---|---|---|
| 6,112,280 | A | | 8/2000 | Shah et al. | |
| 6,125,421 | A | * | 9/2000 | Roy | 711/5 |
| 6,145,069 | A | * | 11/2000 | Dye | 711/170 |
| 6,182,194 | B1 | | 1/2001 | Uemura et al. | |
| 6,487,639 | B1 | * | 11/2002 | Lipasti | 711/137 |
| 6,542,968 | B1 | * | 4/2003 | Spencer et al. | 711/137 |
| 6,560,674 | B1 | * | 5/2003 | Hosogi et al. | 711/118 |
| 7,017,024 | B1 | * | 3/2006 | Arimilli et al. | 711/202 |
| 2002/0044093 | A1 | * | 4/2002 | Wen et al. | 343/702 |
| 2003/0079088 | A1 | * | 4/2003 | Malik | 711/137 |
| 2004/0117556 | A1 | | 6/2004 | Kadi | |
| 2004/0225747 | A1 | | 11/2004 | Kadi | |
| 2005/0136939 | A1 | | 6/2005 | Mountain et al. | |
| 2005/0177712 | A1 | | 8/2005 | Kadi | |

\* cited by examiner

*Primary Examiner*—Matthew Kim
*Assistant Examiner*—Shane M. Thomas
(74) *Attorney, Agent, or Firm*—Jeffrey B. Huter

(57) ABSTRACT

A processor-based device (e.g., a wireless device) may include a processor and a semiconductor memory (e.g., a flash memory) to selectively pipeline and prefetch memory data, such as executable data, in one embodiment, using prefetch/pipeline logic that may enable storage of a first indication associated with executable data at a first storage location and a second indication associated with executable data at a second storage location. Upon retrieval, the prefetch/pipeline logic may selectively perform at least one of pipelining and prefetching of the executable data associated with the second storage location based on the first indication.

28 Claims, 10 Drawing Sheets

SELECTIVITY PIPELINING AND PREFETCHING MEMORY DATA

BACKGROUND

This invention relates generally to storage and retrieval of memory data, and more particularly to pipelining and prefetching of executable memory data associated with various storage locations.

In portable environments or otherwise, many processor-based devices, such as consumer devices may include a semiconductor nonvolatile memory for erasably and programmably storing and retrieving information that may be accessed. One type of commonly available and used semiconductor nonvolatile memory is a flash memory. To operate a consumer device, a mix of code and data may be used in applications, especially in context-driven applications. For instance, a variety of wireless devices including cellular phones may include a flash memory to store different data files and resident applications. Likewise, a portable device, e.g., a personal digital assistant (PDA) may incorporate a flash memory for storing, among other things, certain operating system files and configurable data. As an example, flash memory executable data associated with instructions executing application programs may be stored and retrieved via a resident file management system. These instructions may be accessed in sequence rather than randomly, as is data.

One of the concerns regarding storage and retrieval of memory data involves memory latencies. Power and bandwidth consumption and portability of instructions across platforms or standards is another significant concern, particularly for wireless devices. While accessing instructions, a myriad of techniques including prefetching or pipelining has been deployed to reduce memory latencies. However, the memory latencies have not improved as fast as the operating frequency of microprocessors in processor-based devices. Moreover, conventional methods used for prefetching or pipelining are either static—sequentially prefetching or pipelining cache lines, decreasing the memory latencies at the expense of power or bandwidth consumption, or require additional complex silicon, again increasing power consumption. Likewise, alteration of instruction code to accommodate special no operation (NOP) instructions may cause the instruction code to become unportable across platforms and/or standards.

Thus, there is a continuing need for better ways to store and retrieve memory data.

BRIEF DESCRIPTION OF THE DRAWINGS

Each of FIGS. 1A–1D is a schematic depiction of a processor-based device consistent with one embodiment of the present invention.

DETAILED DESCRIPTION

Figure 1A:
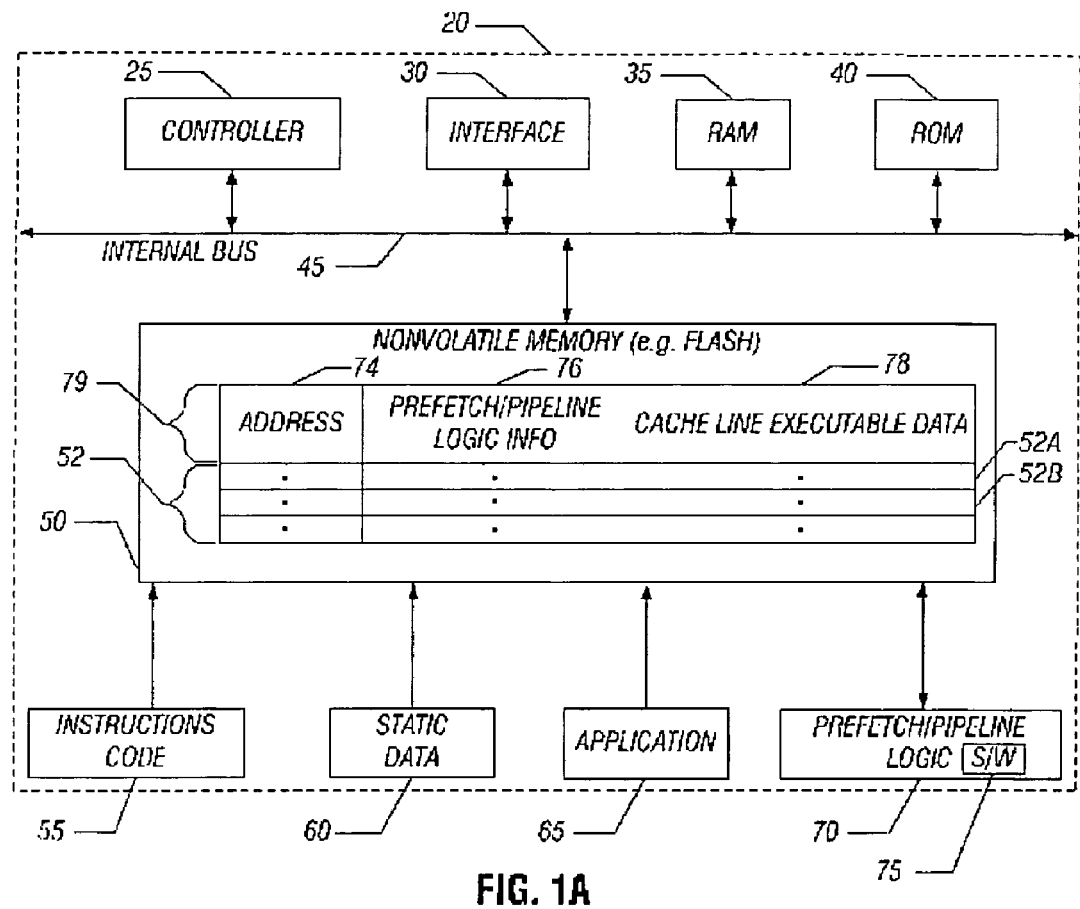

An apparatus 20 (e.g., a processor-based device), as shown in FIG. 1, includes a controller 25 such as a processor that may control an interface 30, enabling a selective storage and retrieval of memory data according to one embodiment of the present invention. The processor-based device 20 further includes a random access memory (RAM) 35 and a read only memory (ROM) 40, both coupled to the controller 25 via an internal bus 45. While the RAM 35 may be provided to store updatable data or programs, the ROM 40 may be used to store programs that do not require any updating during execution.

A semiconductor nonvolatile memory 50 (e.g., a flash memory) may be coupled both to the RAM 35 and the ROM 40 by the internal bus 45 in one embodiment of the present invention. Using instructions code 55, the controller 25 may enable the selective storage and retrieval of memory data, including but not limited to, executable memory data associated with a plurality of storage locations 52 consistent with one embodiment. The plurality of storage locations 52 may include two or more storage locations in some embodiments.

In addition to static data 60, an application 65 may be transformed into an executable program which may be loaded in the semiconductor nonvolatile memory 50 at some point according to different embodiments of the present invention. In this manner, the semiconductor nonvolatile memory 50 may hold the static data 60, allowing predefined or precompiled data to be stored later. In some embodiments, prefetch/pipeline logic 70 along with an associated software 75 may be disposed in the semiconductor nonvolatile memory 50, as shown in FIG. 1D, for selectively performing at least one of pipelining and prefetching of the executable data associated with the plurality of storage locations 52, such as two different storage locations 52 having different addresses 74. A storage location of the plurality of storage locations 52 may represent a cache line 79 according to certain embodiments of the present invention. Cache line 79 may comprise an address 74, prefetch/pipeline logic information 76, and cache line executable data 78 in one embodiment.

Even though one embodiment is described in conjunction with a flash memory storing the instructions code 55, static data 60, application 65, and prefetch/pipeline logic 70, suitable memories may be deployed in other embodiments without deviating from the spirit and scope of the present invention. To mention a few examples of such memories, any type of erasable, programmable memory that can be conventionally and electrically arranged or programmed may be used in a variety of embodiments of the present invention. One particular example of the semiconductor nonvolatile memory 50 is nonvolatile types of read only memory (ROM), such as a flash memory.

Executable data 78 may be desirably stored and retrieved for the processor-based device 20. That is, in one embodiment, the application 65 and/or static data 60 may be upgraded or reconfigured in response to corresponding indications associated with executable data 78 at respective storage locations of the plurality of storage locations 52.

Consistent with multiple embodiments, for a first and a second storage location, the associated logic information 76 may be stored at a first accessible data location (e.g., the leftmost data bit in the cache line 79). In another embodiment, the logic information 76 associated with these first and second storage locations of the plurality of storage locations 52, two or more bits of data may be used at a first accessible data location. Based on the logic information 76, however, the prefetch/pipeline logic 70 may dynamically change the number of bits of data depending upon a particular application in some embodiments.

According to one operation consistent with one embodiment, while a first indication associated with the executable data 78 resident at a first storage location 52A, a second indication associated with the executable data 78 that may be stored at a second storage location 52B within the semiconductor nonvolatile memory 50. Using the first indication, either pipelining and/or prefetching of the executable data 78 associated with the second storage location 52 may be undertaken. To this end, the prefetch/pipeline logic 70 may provide the first indication in a data bit adaptable to carry the logic information 76 indicative of pipelining and/or prefetching.

Figure 1B:
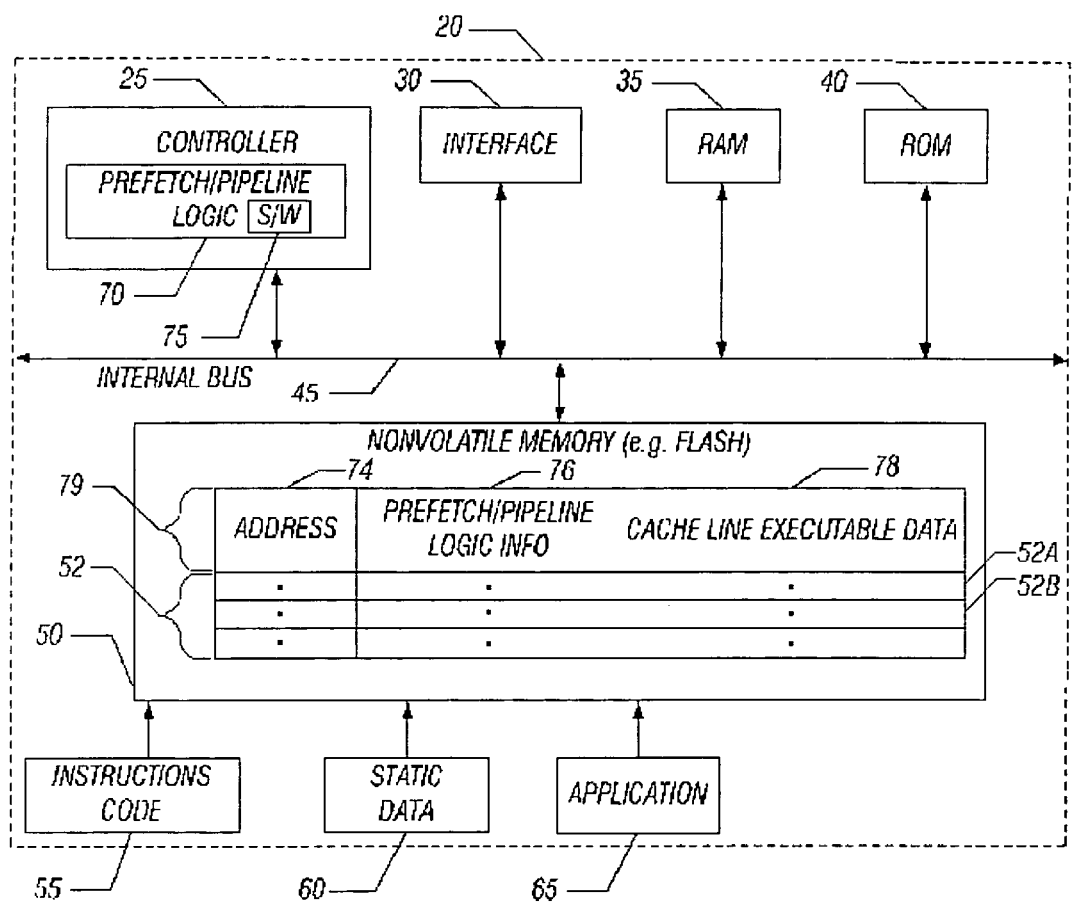
Figure 1C:
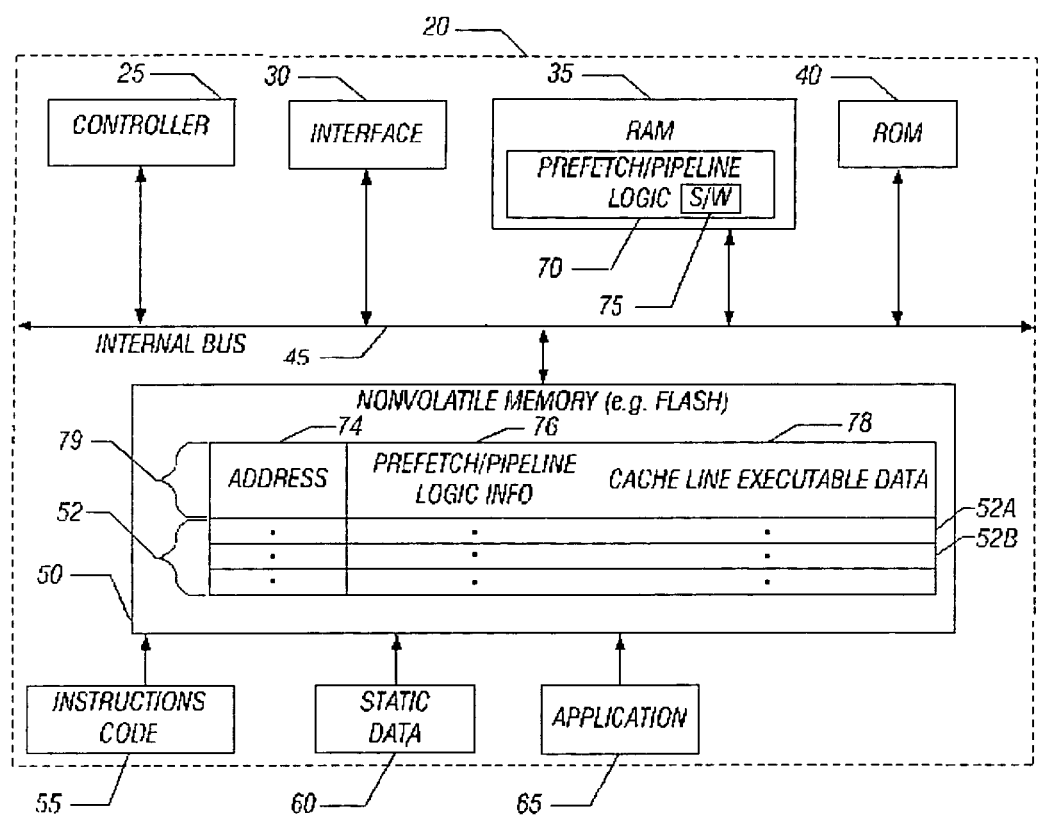
Figure 1D:
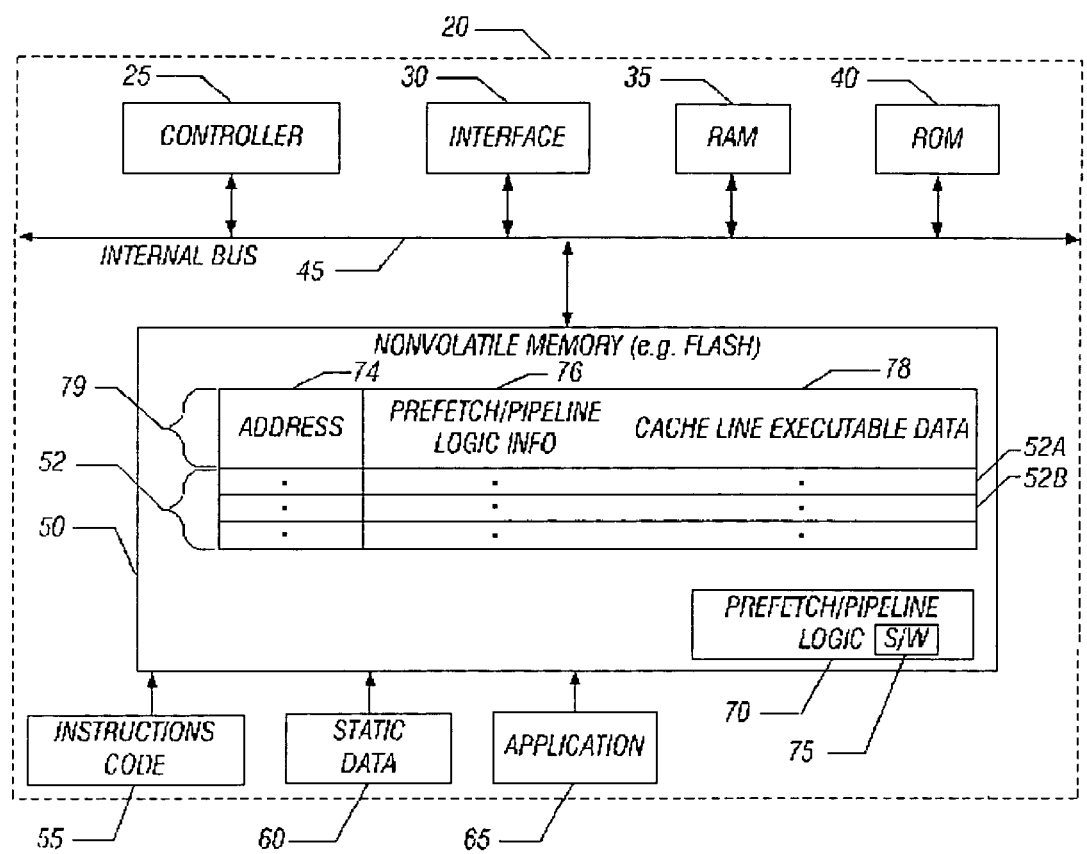

In some embodiments, the prefetch/pipeline logic 70 may be disposed in the controller 25 which may include a memory controller to store the associated software 75, as shown in FIG. 1B. For another embodiment, a volatile memory (e.g., the random access memory (RAM) 35) that stores and downloads instructions in addition to receiving the logic information 76 from a nonvolatile memory space may include the prefetch/pipeline logic 70, for example, as shown in FIG. 1C. Regardless, an indication as to whether or not to pipeline and/or prefetch the executable data 78 associated with the second storage location 52 may be determined, according to the logic information 76 at the data bit, in one embodiment.

Consistent with one embodiment of the present invention, the instructions code 55 may correspond to a semiconductor nonvolatile memory file management program capable of interfacing with a file system and/or an operating system (OS). Likewise, the static data 60 may be managed by any known database management program capable of maintaining a database, storing one or more database entries. The application 65 may be stored in the semiconductor nonvolatile memory 50 as an executable program to be executed in place, e.g., an execute-in-place (XIP) application in some embodiments. Furthermore, from the plurality of storage locations 52 including the associated executable data 78 corresponding to the XIP application 65 may be executed in place within the semiconductor nonvolatile memory 50.

In addition, each cache line 79 may comprise static and dynamic information which may be appropriately identified to determine a usage profile. The usage profile may refer to one or more characteristics of prefetching and/or pipelining associated with each cache line 79, i.e., storage and retrieval pattern over a certain period of time or across a certain number of storage locations for the plurality of storage locations 52, in one embodiment.

Figure 2:
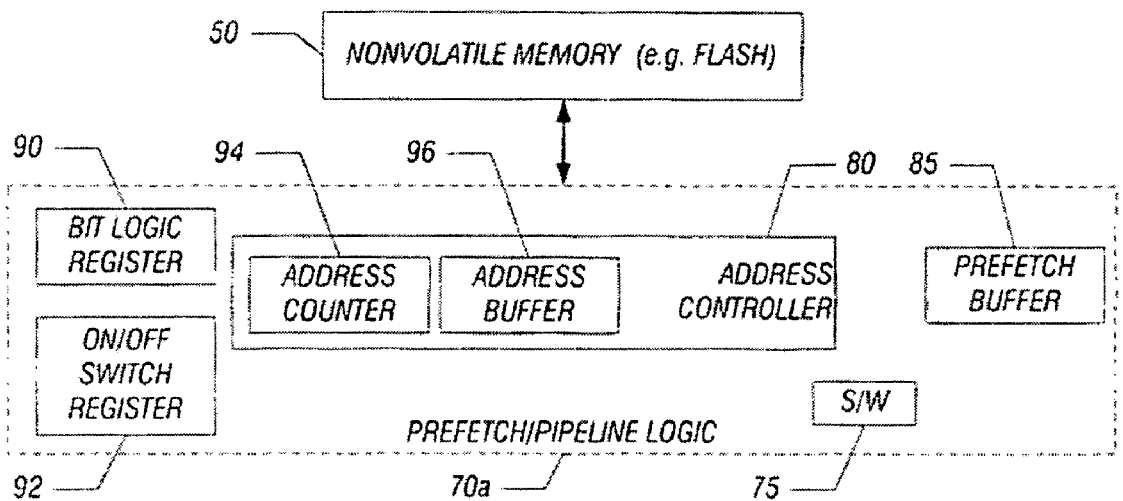
FIG. 2 shows the prefetch/pipeline logic that controls the semiconductor nonvolatile memory shown in FIG. 1, according to one embodiment of the present invention.

Referring to FIG. 2, prefetch/pipeline logic 70a as shown in accordance with one embodiment of the present invention may be associated with the semiconductor nonvolatile memory 50 while including an address controller 80 besides the software 75. To track the addresses 74 of the cache lines 79 (FIG. 1), prefetch/pipeline logic 70a may include a prefetch buffer 85, storing prefetched data including the executable data from the semiconductor nonvolatile memory 50.

Switching of pipelining into an "ON" or "OFF" state may be tracked via a first register, i.e., a bit logic register 90 based on a prefetch data bit, in one embodiment. The bit logic register 90 may hold the prefetch data bit, carrying the logic information 76 on whether or not the next cache line 79 relative to one currently accessed will be prefetched or pipelined, as an example. A second register, i.e., an ON/OFF switch register 92 may further be incorporated in the prefetch/pipeline logic 70a, keeping track of at least a portion of the logic information 76 within the data bit which may either be in an active or an inactive state. Likewise, the ON/OFF switch register 92 may include logic information 76 which may be completely "ON" or "OFF" or partially "ON" or "OFF" in some embodiments of the present invention.

For the purposes of manipulating the addresses 74 (FIG. 1), the address controller 80 may include an address counter 94 and an address buffer 96, according to one embodiment of the present invention. While the address buffer 96 may store one or more addresses 74, the address counter 94 may hold a number indicative of the addresses 74 resident in the address buffer 96 for use by the address controller 80. As an example, depending upon the state of the logic information 76 within the ON/OFF switch register 92, pipelining may be either turned "ON" all the time, or may be turned "OFF" all the time, regardless of the logic information 76 located at the bit logic register 90. Alternatively, in response to a value provided for the logic information 76, the ON/OFF switch register 92 may indicate prefetching and/or pipelining of the cache lines 79 in one embodiment.

Figure 3:
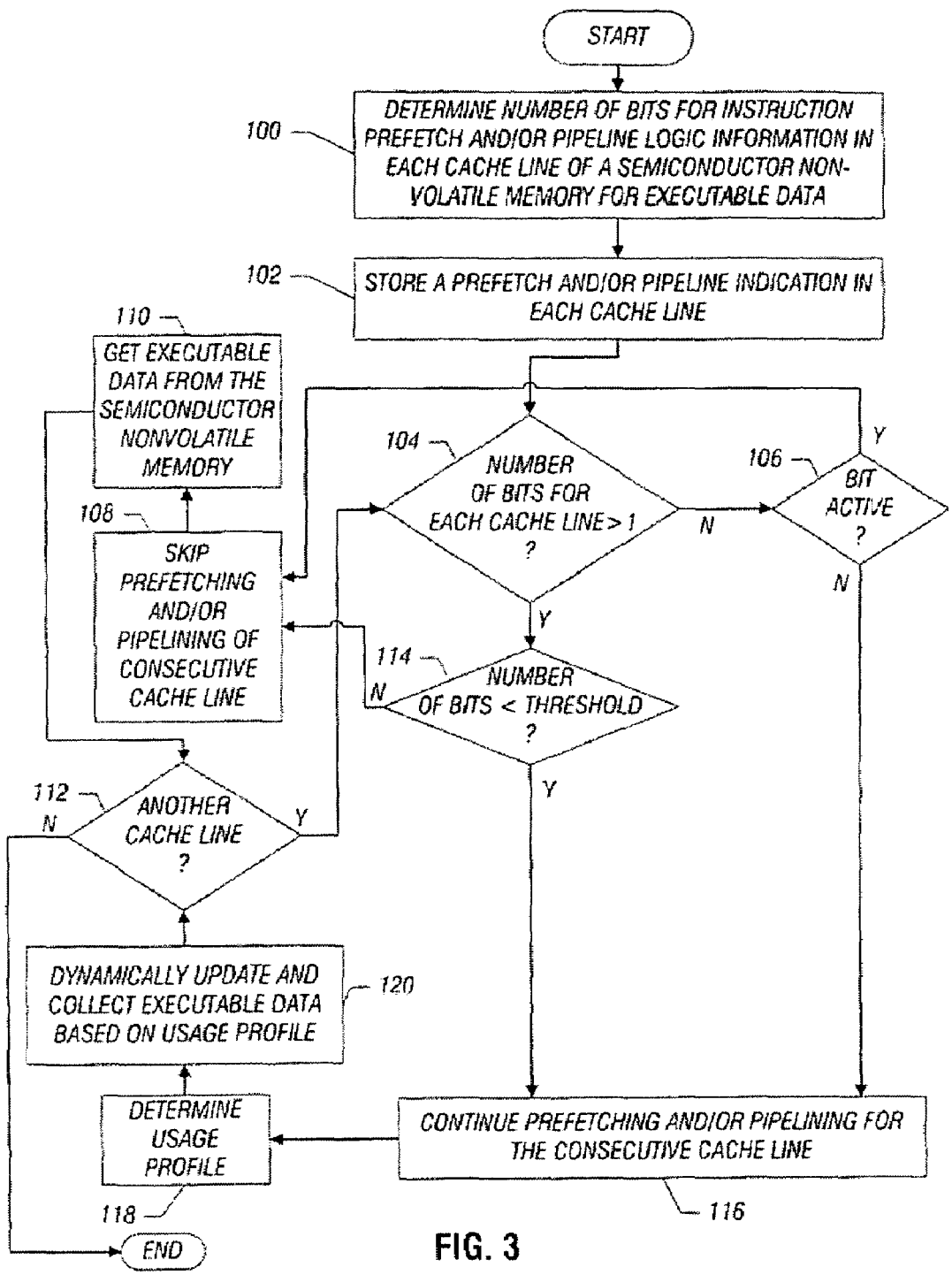
FIG. 3 is a flow chart for selectively performing prefetch/pipeline in the semiconductor nonvolatile memory shown in FIG. 2, in accordance with one embodiment of the present invention.

Turning now to FIG. 3, at block 100, a number of one or more data bits may be identified to determine prefetching and/or pipelining logic information of an instruction at the cache line 79 with the executable data 78 in the semiconductor nonvolatile memory 50. At block 102, a prefetch and/or pipeline indication may be stored in the cache line 79 across the number of data bits during storage. While retrieving the executable data 78, a check at diamond 104 may indicate whether the number of data bits in the cache line 79 are greater than one. If the check indicates that the number of data bits to be a single data bit at the diamond 104, another check at diamond 106 may ascertain whether or not that data bit is active or not. When the data bit at the diamond 106 is determined to be active, the prefetching and/or pipelining of the consecutive cache lines 79 may be skipped at block 108, in one embodiment. In this manner, the executable data 78 associated with the consecutive cache line 79 may be obtained from the semiconductor nonvolatile memory 50 at block 110.

At check at diamond 112 may determine if another cache line 79 may be desired to be retrieved in some embodiments of the present invention. Should another cache line 79 need retrieval at the diamond 112, the number of data bits for that cache line 79 may again be determined at diamond 104. Conversely, if there are no cache lines 79 left to be accessed, the flow ends. At block 104, however, if the number of data bits for the cache lines 79 are indicated to be more than one, then the number of data bits may be compared with a predetermined threshold which in one embodiment may refer to a specified level of maximum power consumption to be met as a design constraint in the semiconductor nonvolatile memory 50. An example of the threshold may include a value indicative of certain number of data bits below which pre-fetching and/or pipelining may continue for the consecutive cache 79 lines.

In a situation where the number of data bits are indicated to be only one bit at the diamond 104 and that data bit is not active, as shown at the diamond 106, then the prefetching and/or pipelining of the consecutive cache line 79 may be continued at block 116, in some embodiments of the present invention. Likewise, if the number of data bits are indicated to be less than the threshold at the diamond 114, the prefetching and/or pipelining may continue also at the block 116.

In any event, a user profile may be determined at block 118 in one embodiment. An example of the user profile includes an indication showing use of the processor-based device 20, such as by a particular user, involving the semiconductor nonvolatile memory 50 for selectively prefetching and/or pipelining of the cache lines 79. The user profile may be derived by identifying the static and dynamic information obtained from one or more cache lines 79, as an example. At block 120, the executable data 78 associated with each cache line 79 may be dynamically updated and collected based on the user profile in accordance with one embodiment of the present invention. The presence of another cache line 79, or alternatively the absence of the same, may be determined at the diamond 112. Again, if another cache line 79 is detected, the flow continues further to the diamond 104. Otherwise, the flow ends according to one embodiment.

Figure 4A:
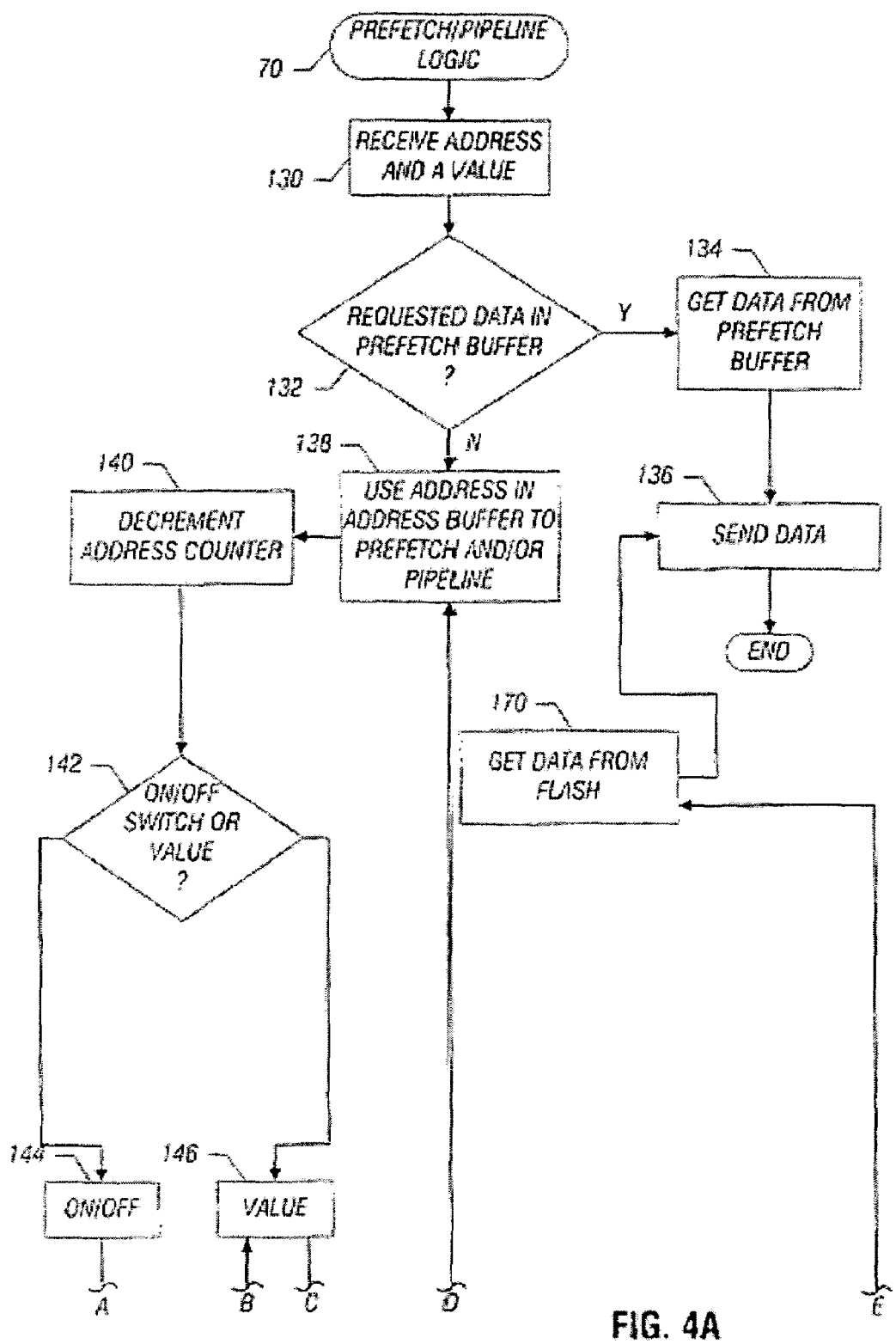
FIG. 4A is a partial flow chart for the prefetch/pipeline logic shown in FIG. 1 consistent with one embodiment of the present invention.
Figure 4B:
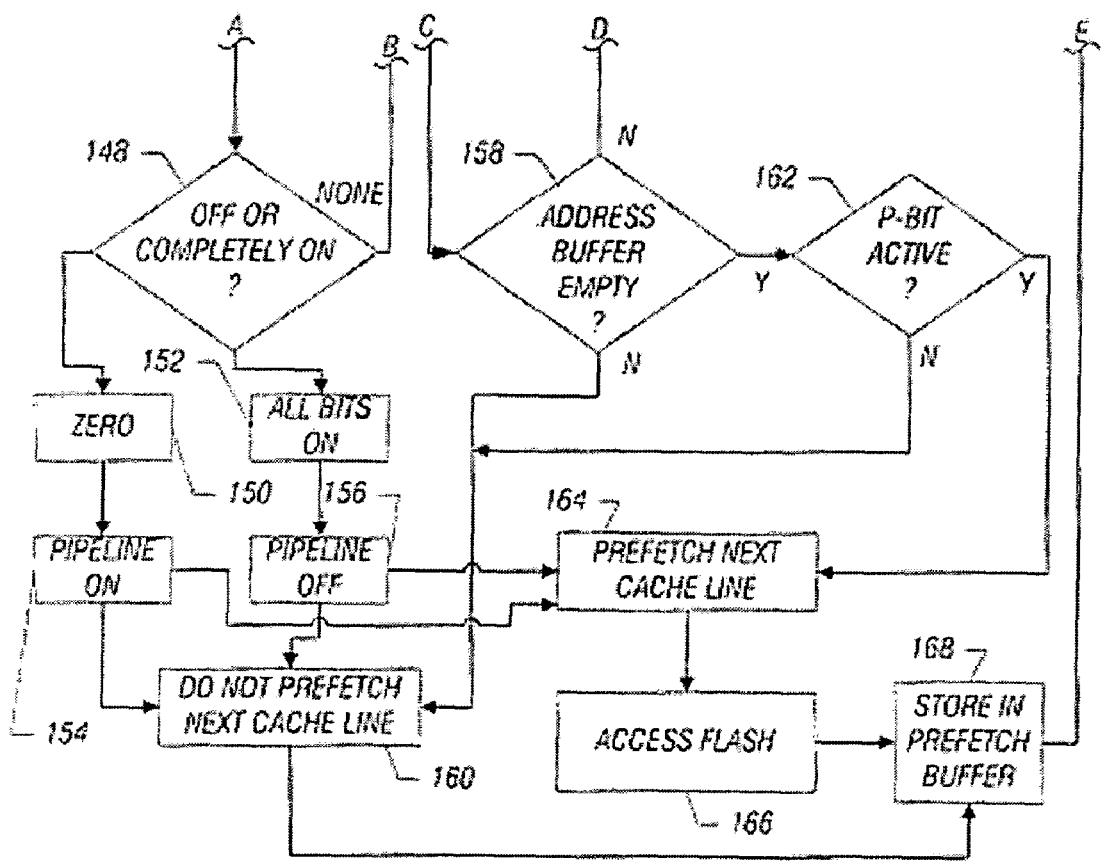
FIG. 4B is a partial flow chart continuing from FIG. 4A for the prefetch/pipeline logic shown in FIG. 1.

Referring to FIGS. 4A and 4B, to selectively pipeline and/or prefetch the executable data 78 associated with the cache lines 79, prefetch/pipeline logic 70 may receive address 74 and a value for a threshold at block 130 consistent with one embodiment of the present invention. Examples of the value for the threshold include an indication for use to get the next cache line 79 from the semiconductor nonvolatile memory 50. Of course, other indications as the value are possible in some embodiments of the present invention. A dynamic threshold may be provided in one embodiment by changing the value for the threshold based on utilization of one or more cache lines 79. In some embodiments, a Bayesian logic based threshold, e.g., a 50/50 threshold as a starting value may be used. Based on the dynamic updates, a usage profile may be generated consistent with one embodiment of the present invention.

As shown in FIG. 4A, check at diamond 132 may indicate whether or not requested data is present in the prefetch buffer 85. In the event that the requested data may be determined to be present at the prefetch buffer 85, at block 134, the requested data may be obtained therefrom accordingly. Thereafter, at block 136, the data may be sent to its desired destination which may vary depending upon a particular application for which the prefetch/pipeline logic 70 is deployed. For example, if the prefetch/pipeline logic 70 is implemented in a wireless device, such as a cellular phone, then the requested data may be sent over a network or bus to the requestor. Of course, other forms of data communications are possible in several embodiments of the present invention.

At block 138, the address buffer 96 may use the address 74 to prefetch and/or pipeline a particular cache line 79. Absent the requested data corresponding to the address 74 in the prefetch buffer 85 at the diamond 132, then at block 138 a prefetch and/or pipeline may be performed according to one embodiment. The address counter 94 which keeps track of the addresses 74, may first be decremented at block 140, indicating to the address controller 80 that the number of addresses 74 left to be processed by the prefetch/pipeline logic 70 in one embodiment.

While continuing the prefetch and/or pipeline process, in one embodiment, a check at diamond 142 as to the status of the ON/OFF switch register 92 (FIG. 2) or to the value for the threshold may be undertaken. If only an ON/OFF logic information may be indicated at block 144, then a check at diamond 148 shown in FIG. 4B may ascertain whether or not the logic information 76 is completely turned "ON" or alternatively is turned "OFF." The presence of a value for the threshold, however, may be indicated at block 146, in some embodiments, as was shown in FIG. 4A.

In the embodiment depicted in FIG. 4B, the presence of zeroes, as shown in block 150, for one or more data bits in the ON/OFF switch register 92 may indicate an "ON" status for performing pipelining at block 154. Conversely, if at the diamond 148 all data bits are determined to be "ON," as shown in block 152, then in turn, the pipelining may be turned "OFF" at block 156.

When a value for the threshold (e.g., a threshold value of five, i.e., provided at an address 74 in hexadecimal format, e.g., 0x70000020) may be indicated at block 146 (FIG. 4A), a check at diamond 158 may determine whether the address buffer 96 is empty or not, i.e., if another address 74 is present in the address buffer 96 or the last address is reached. When the address buffer 96 is indicated not to be empty at the diamond 158, the next cache line 79 may not be prefetched at block 160 instead nonconsecutive addresses in the address buffer 96 may be used for prefetching and/or pipelining as shown in block 138, according to one embodiment of the present invention. Otherwise, if the address buffer 96 is indicated to be empty, then a check at diamond 162 may determine the logic state of the data bit, e.g., a prefetch bit (P-bit), in the bit logic register 90 (FIG. 2). In one embodiment, an active logic for the P-bit is checked at the diamond 162. If the P-bit is indicated to be active, then the next cache line 79 may be prefetched at block 164 and the pipelining is determined based on the turning of the ON/OFF switch register 92 into an "ON" or an "OFF" state, i.e., at blocks 154 and 156.

The prefetched next cache line 79 may be stored in the prefetch buffer 85 at block 168, in one embodiment by appropriately accessing the semiconductor nonvolatile memory 50 at block 166. At block 170 as shown in FIG. 4A, in one embodiment, the requested data (e.g., including the executable data 78) may be obtained from the semiconductor nonvolatile memory 50 (e.g., a flash memory). Finally, this data may be sent to an intended recipient at block 136.

While storing the executable data 78, in one embodiment, instructions in the cache lines 79 may be pre-processed. One approach may involve pre-processing of the instruction in the cache lines 79, and another may rely on a compiler for determining whether or not to set the P-bit. Furthermore, setting of the ON/OFF switch register 92 to a certain value may be determined, such as to a predefined maximum value or a zero. In addition, storing of the instructions code 55 as the executable data 78 along with the prefetch bits (P-bits) may be decided one way or the other during pre-processing. Accordingly, pipelining and prefetching may be undertaken based on the value of the P-bit equal to "1." In other words, prefetching may be done based on the logic information 76 stored in the P-bit, i.e., by checking whether the P-bit is "OFF," the ON/OFF switch register 92 is set as indicated above, the address buffer 97 is empty, and there is space available in the prefetch buffer 85 consistent with one embodiment.

To store and/or retrieve memory data by selectively pipelining and/or prefetching of executable memory data associated with various storage locations, the semiconductor nonvolatile memory 50, such as a flash memory may be deployed in wireless or wireless-enabled devices according to some embodiments of the present invention. As an example, a PDA may incorporate a flash memory for code and data storage file management in some situations. In another example, a flash memory may be used within a cellular phone for storage and/or retrieval of media content received or sent over a network.

Figure 5A:
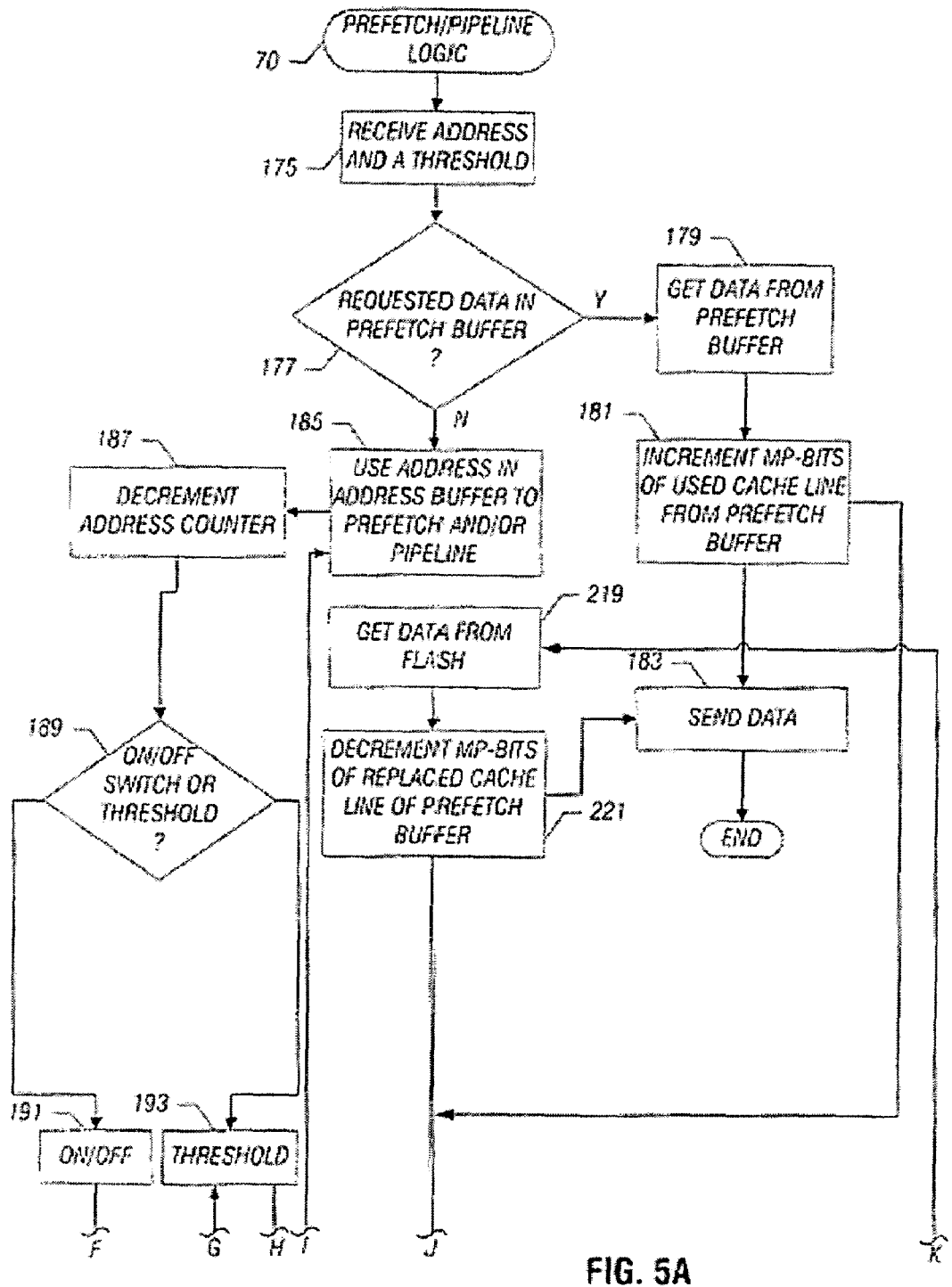
FIG. 5A is a partial flow chart for the prefetch/pipeline logic shown in FIG. 1, according to another embodiment of the present invention.
Figure 5B:
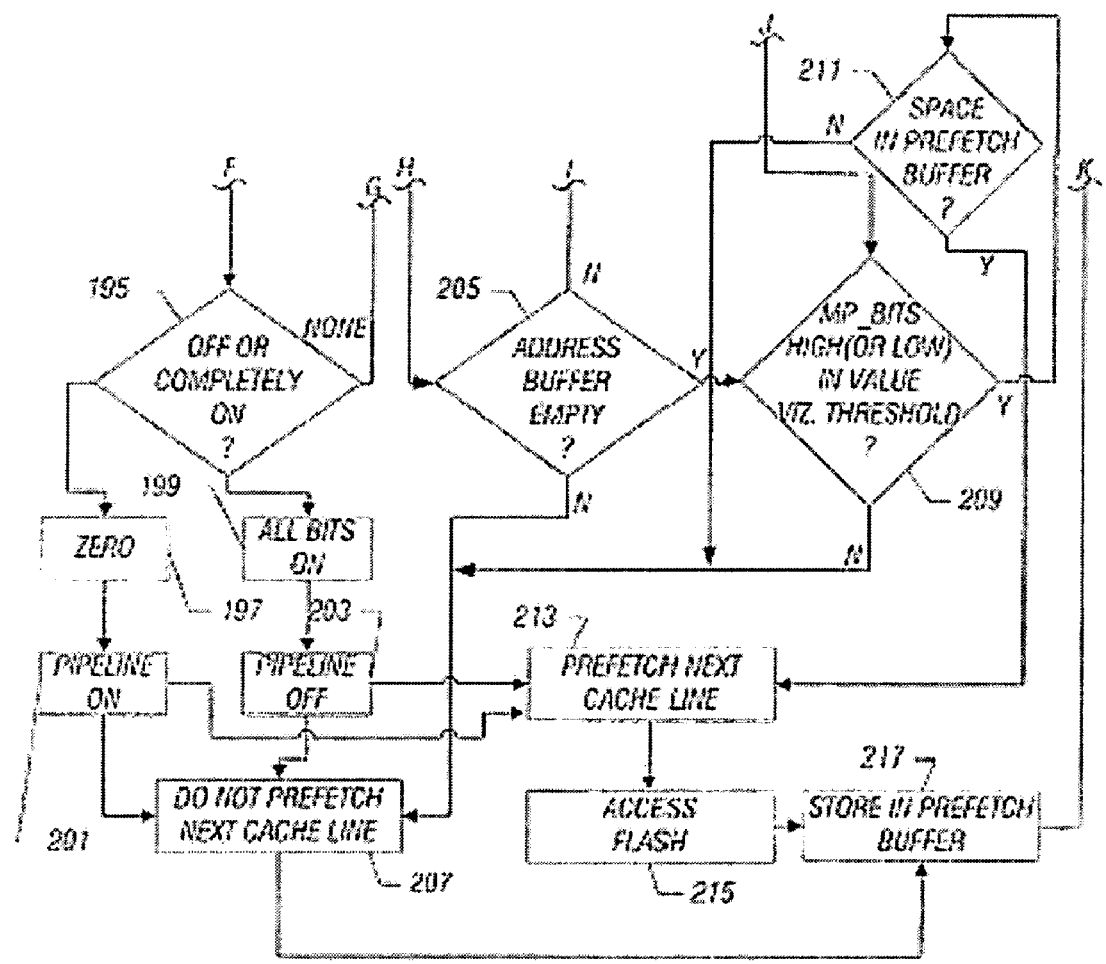
FIG. 5B is a partial flow chart continuing from FIG. 5A for the prefetch/pipeline logic shown in FIG. 1.

Referring to FIGS. 5A and 5B, to store speculative pre-fetching and/or usage information with multiple bits (e.g., the number of which may be dynamically changed), in another embodiment of the present invention, prefetch/pipeline logic 70 may receive address 74 and a threshold at block 175. A check at diamond 177 may indicate whether or not requested data is present in the prefetch buffer 85. If the requested data is determined to be present at the prefetch buffer 85, at block 179, the requested data may be obtained from the prefetch buffer 85. However, the number of prefetch bits (MP-bits) associated with the cache line 79 from which the requested data is prefetched from the prefetch buffer 85 may be incremented at block 181. As a result, the threshold may be changed based on user activity factors of the processor-based device 20, i.e., a usage profile of the semiconductor nonvolatile memory 50, providing a dynamic threshold primarily dependent upon device utilization. Thereafter, at block 183, the prefetched data may be sent to a requestor based on a specific application for which the prefetch/pipeline logic 70 is used.

At block 185, the address buffer 96 may use the address 74 to prefetch and/or pipeline a particular cache line 79. To keep track of the addresses, the address counter 94 may be decremented at block 187, indicating to the address controller 80 the remaining number of addresses 74 that may desire processing by the prefetch/pipeline logic 70 in one embodiment.

A check at diamond 189 as to the status of the ON/OFF switch register 92 (FIG. 2) or to the threshold may be done, in one embodiment. If only an ON/OFF logic information is indicated at block 191, then a check at diamond 195 (FIG. 5B) may ascertain whether or not the logic information 76 is completely turned "ON" or alternatively is turned "OFF." A value for the threshold may be indicated at block 193, in some embodiments. Likewise, zeroes at block 197 for one or more data bits in the ON/OFF switch register 92 may indicate an "ON" status for performing pipelining at block 201. Otherwise, if at the diamond 195 all data bits are indicated to be "ON," as shown in block 199, the pipelining may be turned "OFF" at block 203.

While a value for the threshold is identified at block 193, a check at diamond 205 may determine whether the address buffer 96 is empty or not. That is, if another address 74 is present or not in the address buffer 96. When at the diamond 205, the address buffer 96 still holding one or more addresses 74, the next cache line 79 may not be prefetched at block 207, instead addresses in the address buffer 96 may be used for prefetching and/or pipelining as shown in block 185 in accordance with one embodiment of the present invention.

However, if the address buffer 96 is indicated to be empty, then a check at diamond 209 may determine the logic state of the data bits, e.g., the number of prefetch bits (MP-bits), in bit logic register 90 (FIG. 2). That is, whether the MP-bits are high (or low) in value relative to the value of the threshold. In one embodiment, an active logic for the MP-bits is checked at the diamond 209. In particular, the MP-bits may be compared against the value of threshold. When inactive, e.g., lower than the threshold value, prefetching of the next cache line 79 is not to be undertaken. When active, e.g., higher value, then availability of space in the prefetch buffer 85 may be checked at diamond 211. Active MP-bits and availability of memory space in the prefetch buffer 85 may cause prefetching of the next cache line 79 at block 213 in addition to the pipelining based on the turning of the ON/OFF switch register 92 into an "ON" or an "OFF" state, i.e., at blocks 201 and 203. Conversely, unavailability of memory space in the prefetch buffer 85 may result in not prefetching the next cache line 79 according to some embodiments of the present invention.

By appropriately accessing the semiconductor nonvolatile memory 50, at block 215, the prefetched next cache line 79 may be stored in the prefetch buffer 85 at block 217, in one embodiment. At block 219, the requested data which may include the executable data 78 may further be obtained from the semiconductor nonvolatile memory 50 (e.g., a flash memory). Before sending this data to an intended recipient at block 183, the number of MP-bits in the replaced cache line 79 that of the prefetch buffer 85 may be decremented at block 221.

Figure 6:
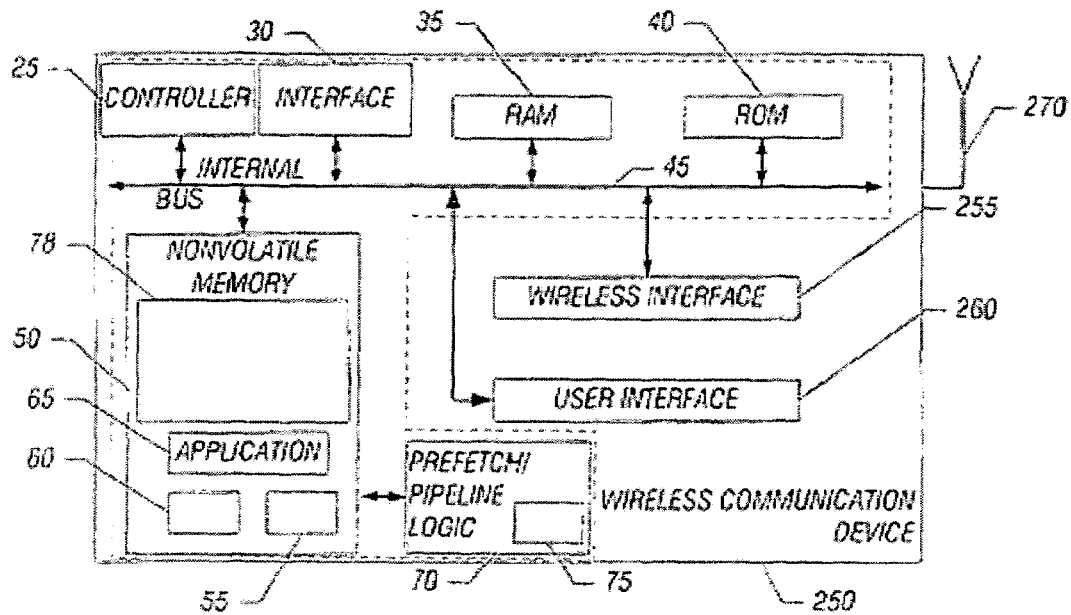
FIG. 6 shows a wireless communication device that uses the prefetch/pipeline logic shown in FIG. 1, consistent with an embodiment of the present invention.

A wireless communication device 250 shown in FIG. 6 may include a wireless interface 255, a user interface 260, and a requester device (not shown) which may have an antenna 270 (for example, a dipole antenna) associated therewith in addition to the components of the processor-based device 20 (FIG. 1) according to one embodiment of the present invention. Although this particular embodiment is described in the context of wireless communications, other embodiments of the present invention may be used in any one of situations that involve storage and retrieval of memory data. Examples of the wireless communication device 250 include mobile devices and/or cellular handsets that may involve storage and/or retrieval of memory data provided over an air interface to the wireless communication device 250 in one embodiment. In any event, for executing the application 65 from the semiconductor nonvolatile memory 50, the wireless interface 255 may be operably coupled to the antenna 270 via the internal bus 45, exchanging network traffic under the control of the prefetch/pipeline logic 70.

Figure 7:
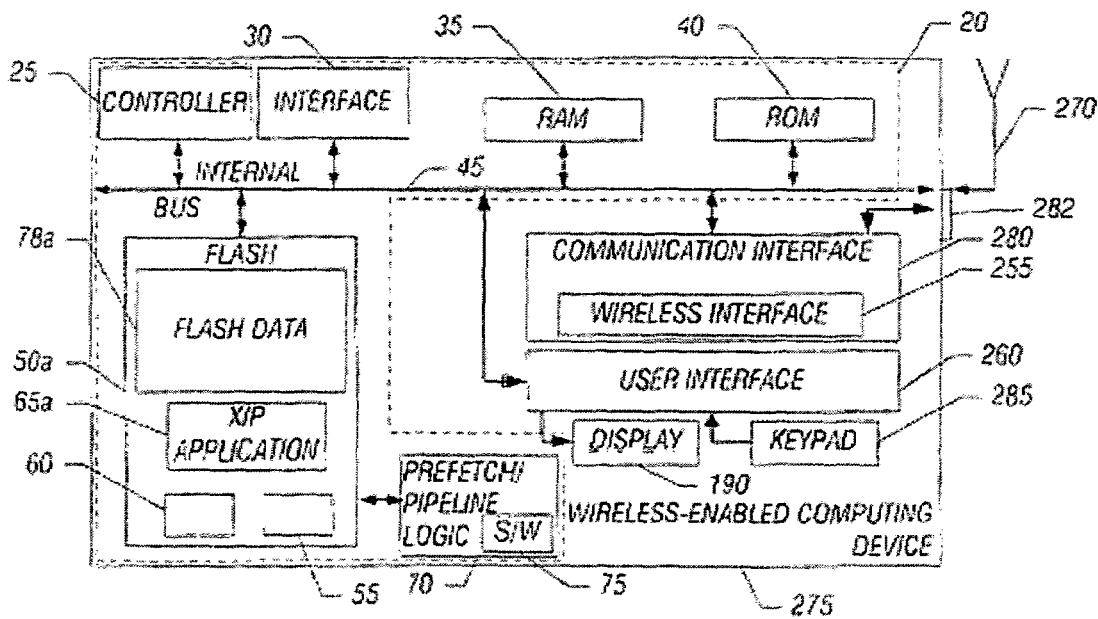
FIG. 7 shows a wireless-enabled computing device that uses the prefetch/pipeline logic shown in FIG. 1, according to another embodiment of the present invention.

Likewise, a wireless-enabled computing device 275 shown in FIG. 7 may include a communication interface 280 operably coupled to a communication port 282 that may communicate information to and from a flash memory 50*a* in accordance with one embodiment of the present invention. While a keypad 285 may be coupled to the user interface 260 to input information, a display 290 may output any information either entered into or received from the user interface 260. The wireless interface 255 may be integrated with the communication interface 280 which may receive or send any wireless or wireline data via the communication port 282. For a wireless communication, the antenna 270 may operate according to any suitable one or more network communication protocols capable of wirelessly transmitting and/or receiving voice, video, or data. Likewise, the communication port 282 may be adapted by the communication interface 280 to receive and/or transmit any wireline communications over a network.

Furthermore, within the flash memory 50*a* flash data 78*a* incorporating the executable data of an XIP application 65*a* may be stored along with the static data 60 in some embodiments of the present invention. The XIP application 65*a* may be executed from the flash memory 50*b*. Using the prefetch/ pipeline logic 70, the wireless-enabled computing device 275 may be enabled for executing the XIP application 65a and other features using the flash memory 50a in some embodiments of the present invention. As an example, in one embodiment, mobile devices and/or cellular handsets may benefit from such a selective prefetch/pipeline technique based on the prefetch/pipeline logic 70, providing an ability to manage code, data, and files in the flash memory 50a. A flash management software may be used in real-time embedded applications in some embodiments as another example. This flash management software may provide support for applets, file transfers, and voice recognition. Using an application program interface (API) that supports storage and retrieval of data, based on the prefetch/pipeline logic 70, data streams for multimedia, Java applets and native code for direct execution, and packetized data downloads may be handled in some embodiments of the present invention.

Storage and retrieval of the executable data 78 ranging from native software compiled strictly for a processor in a system, to downloaded code, which is read and interpreted by a middleware application (such as an applet) may be obtained in one embodiment for the flash memory 50a. By selectively prefetching and/or pipelining a cache line's location address 74 in the flash memory 50a, XIP code execution may be enabled in some embodiments.

By combining of all semiconductor nonvolatile memory functions into a single chip, a combination of executable data and other static data may be obtained in a single flash memory chip for the flash memory 50a in other embodiments. In this manner, a system using an operating system (OS) may store and retrieve both the code 55 and the data 60, while the executable data 78 may be directly executed, demand paged, or memory mapped in some embodiment of the present invention.

While the present invention has been described with respect to a limited number of embodiments, those skilled in the art will appreciate numerous modifications and variations therefrom. For example, some embodiments may be implement as an article comprising a medium storing instructions that, when executed result in selectively performing pipelining and prefetching of the executable data. It is intended that the appended claims cover all such modifications and variations as fall within the true spirit and scope of this present invention.

What is claimed is:

1. A method comprising:
   storing in a data bit a first indication at a first storage location and in another data bit a second indication at a second storage location;
   selectively performing at least one of pipelining and prefetching of executable data associated with the second storage location based on said first indication, wherein the second storage location is consecutive relative to the first storage location;
   indicating an active logic in the data bit at the first storage location to avoid at least one of pipelining and prefetching of the second storage location and
   determining whether the second storage location to be consecutive relative to the first storage location based on said active logic.

2. The method of claim 1 comprising providing said first indication in the data bit adaptable to carry logic information indicative of pipelining and prefetching within a semiconductor memory.

3. The method of claim 2 comprising, based on said logic information at the data bit, determining whether or not to perform at least one of pipeline and prefetch of the executable data associated with the second storage location.

4. The method of claim 1 comprising:
   indicating an inactive logic in the data bit at the first storage location to cause at least one of pipelining and prefetching of the second storage location; and
   determining, whether the second storage location to be nonconsecutive relative to the first storage location, based on said inactive logic.

5. The method of claim 1 comprising:
   identifying static and dynamic information in the first and second storage locations; and
   determining a usage profile based on said static and dynamic information.

6. The method of claim 5 comprising dynamically updating and collecting the executable data associated with the first and second storage locations based on the usage profile.

7. The method of claim 1 comprising storing said first and second indications at a first accessible data location of a corresponding one of the first and second storage locations.

8. The method of claim 1 comprising collectively storing said first and second indications into two or more bits of data.

9. The method of claim 8 comprising dynamically changing the number of bits of data based on logic information of the first indication and the second indication.

10. The method of claim 8, comprising performing at least one of pipelining and prefetching of the second storage location based on the number of the one or more data bits associated with the first indication.

11. An apparatus comprising:
   a controller;
   a semiconductor memory operably coupled to said controller, said semiconductor memory to store in a data bit a first indication at a first storage location and in another data bit a second indication at a second storage location to selectively perform at least one of pipelining and prefetching of executable data associated with the second storage location based on said first indication, wherein the first and second indications are associated with executable data;
   a first register to track switching of pipelining of the executable data associated with the second storage location between an "ON" or an "OFF" state based on the data bit; and
   a logic module to provide said first indication in the data bit, said data bit adaptable to carry logic information indicative of said at least one of pipelining and prefetching, wherein said logic module is disposed in a volatile memory that stores and downloads instructions and receives said logic information from a nonvolatile memory space.

12. The apparatus of claim 11, wherein said logic module is disposed in said controller.

13. The apparatus of claim 11, wherein said logic module is disposed in said semiconductor memory.

14. The apparatus of claim 11, wherein said logic module determines whether or not to perform at least one of pipeline and prefetch of the executable data associated with the second storage location based on said logic information.

15. The apparatus of claim 11, further comprising:
   a second register to track switching of said logic information into an active or inactive state in the data bit.

16. The apparatus of claim 15, wherein said second register to store two or more bits of data that are located at a first accessible data location of each of the first and second storage locations, and said logic module to dynamically change the number of bits of data based on said logic information.

17. An apparatus comprising:
a controller:
a semiconductor memory operably coupled to said controller, said semiconductor memory to store in a data bit a first indication at a first storage location and in another data bit a second indication at a second storage location to selectively perform at least one of pipelining and prefetching of executable data associated with the second storage location based on said first indication, wherein the first and second indications are associated with executable data; and
a first register to track switching of pipelining of the executable data associated with the second storage location between an "ON" or an "OFF" state based on the data bit;
a first buffer to store one or more addresses; and
an address controller to hold a number indicative of the one or more addresses resident in the first buffer.

18. The apparatus of claim 17, further comprising:
a second buffer to store prefetched data.

19. An article comprising a tangible medium storing instructions that, when executed result in:
storing in one or more bits of data a first indication at a first storage location and in another one or more bits of data a second indication at a second storage location, wherein the first and second indications are associated with executable data;
selectively performing at least one of pipelining and prefetching of the executable data associated with the second storage location based on the number of the one or more data bits associated with said first indication;
indicating an inactive logic in the one or more data bits at the first storage location to cause pipelining and/or prefetching of the second storage location; and
determining, whether the second storage location to be nonconsecutive relative to the first storage location, based on said inactive logic.

20. The article of claim 19, comprising a tangible medium storing instructions that, when executed result in providing said first indication in the one or more data bits, the one or more data bits adaptable to carry logic information indicative of pipelining and prefetching within a semiconductor memory.

21. The article of claim 20, comprising a tangible medium storing instructions that when executed result in, based on said logic information at the one or more data bits, determining whether or not to perform at least one of pipeline and prefetch the executable data associated with the second storage location.

22. The article of claim, 19 comprising a tangible medium storing instructions that, when executed result in:
indicating an active logic in the one or more data bits at the first storage location to skip pipelining and/or prefetching of the second storage location;
determining whether the second storage location to be consecutive relative to the first storage location based on said active logic; and
indicating an active logic in the one or more data bits at the first storage location to avoid at least one of pipelining and prefetching of the second storage location in response to determining that the second storage location is consecutive relative to the first storage location.

23. The article of claim 19, comprising a tangible medium storing instructions that, when executed result in:
identifying static and dynamic information in the first and second storage locations; and
determining a usage profile based on said static and dynamic information at each of the first and second storage locations.

24. The article of claim 23, comprising a tangible medium storing instructions that, when executed result in dynamically updating and collecting the executable data associated with the first and second storage locations based on the usage profile.

25. The article of claim 19, comprising a tangible medium storing instructions that, when executed result in storing said first and second indications at a first accessible data location of a corresponding one of the first and second storage locations.

26. The article of claim 25, comprising a tangible medium storing instructions that, when executed result in storing for the corresponding one of first and second storage locations said first and second indications into one or more bits of data at first accessible data location.

27. The article of claim 19, comprising a tangible medium storing instructions that, when executed result in dynamically changing the number of bits of data based on logic information of the first indication and the second indication.

28. An apparatus comprising:
a controller;
a semiconductor memory operably coupled to said controller, said semiconductor memory to store in at least one data bit a first indication at a first storage location and in another at least one data bit a second indication at a second storage location to selectively perform at least one of pipelining and prefetching of executable data associated with the second storage location based on said first indication, wherein the first and second indications are associated with executable data; and
a first register to track switching of pipelining of the executable data associated with the second storage location between an "ON" or an "OFF" state based on the at least one data bit,
wherein the semiconductor memory to store in two or more bits of data the first indication to selectively perform at least one of pipelining and prefetching of the second storage location based on the number of the data bits associated with the first indication.

* * * * *